United States Patent
Yatsu et al.

(10) Patent No.: US 7,639,451 B2
(45) Date of Patent: Dec. 29, 2009

(54) THIN-FILM MAGNETIC HEAD, HEAD GIMBAL ASSEMBLY, AND HARD DISK SYSTEM

(75) Inventors: Hideyuki Yatsu, Tokyo (JP); Akifumi Kamijima, Tokyo (JP); Hitoshi Hatate, Tokyo (JP); Tomoyuki Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 512 days.

(21) Appl. No.: 11/668,820

(22) Filed: Jan. 30, 2007

(65) Prior Publication Data

US 2008/0180840 A1 Jul. 31, 2008

(51) Int. Cl.
*G11B 5/147* (2006.01)
(52) U.S. Cl. ................................. 360/125.09
(58) Field of Classification Search ............ 360/125.09, 360/125.38, 125.12, 125.06, 125.07, 125.08, 360/125.46, 317, 125.03
See application file for complete search history.

(56) References Cited

U.S. PATENT DOCUMENTS

| 6,952,325 B2 * | 10/2005 | Sato et al. .............. 360/125.08 |
| 7,535,675 B2 * | 5/2009 | Kimura et al. ......... 360/125.09 |
| 2007/0041126 A1 * | 2/2007 | Sasaki et al. ................ 360/126 |
| 2007/0195454 A1 * | 8/2007 | Kimura et al. .............. 360/126 |
| 2007/0211379 A1 * | 9/2007 | Kato et al. .................. 360/126 |
| 2008/0180839 A1 * | 7/2008 | Mochizuki et al. ...... 360/125.03 |

FOREIGN PATENT DOCUMENTS

| JP | 8-147623 | 6/1996 |
| JP | 9-106508 | 4/1997 |

* cited by examiner

*Primary Examiner*—Allen T Cao
(74) *Attorney, Agent, or Firm*—Oblon, Spivak, McClelland, Maier & Neustadt, L.L.P.

(57) ABSTRACT

There is a thin-film magnetic head provided, which comprises a perpendicular recording head portion including a thin-film coil adapted to generate a magnetic flux, and a main magnetic pole layer that extends rearward from a recording medium opposite plane facing a recording medium and has a main magnetic pole adapted to release a magnetic flux produced at the thin-film coil toward the recording medium. A given concave groove form that is more constricted as the lower end draws nearer is provided at or near the flare point of the front end of the main magnetic pole, so that the flow of the magnetic flux through the main magnetic pole is focused on the upper end edge (gap portion), thereby improving overwrite performance and holding back the occurrence of pole erasure.

13 Claims, 9 Drawing Sheets

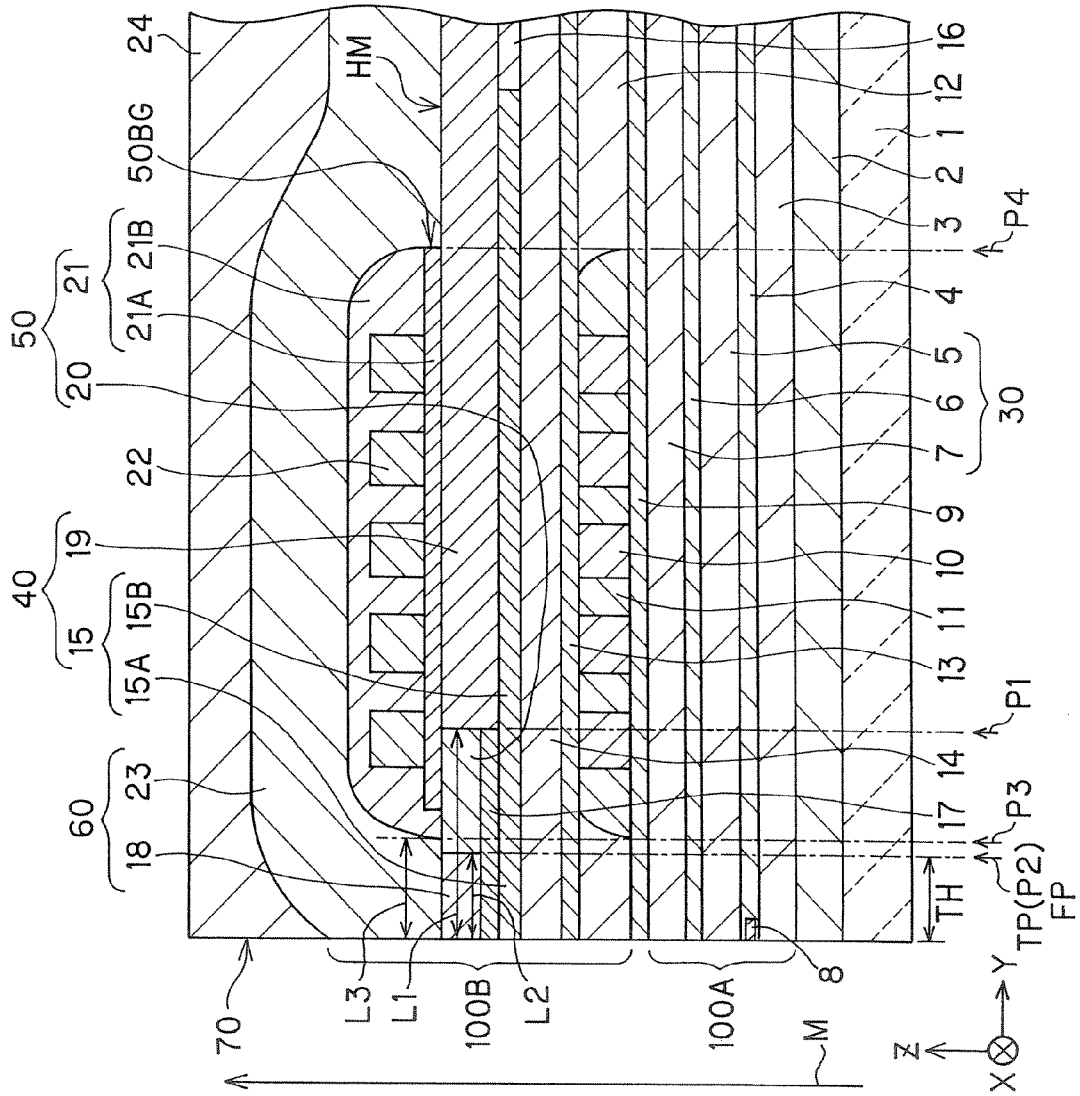
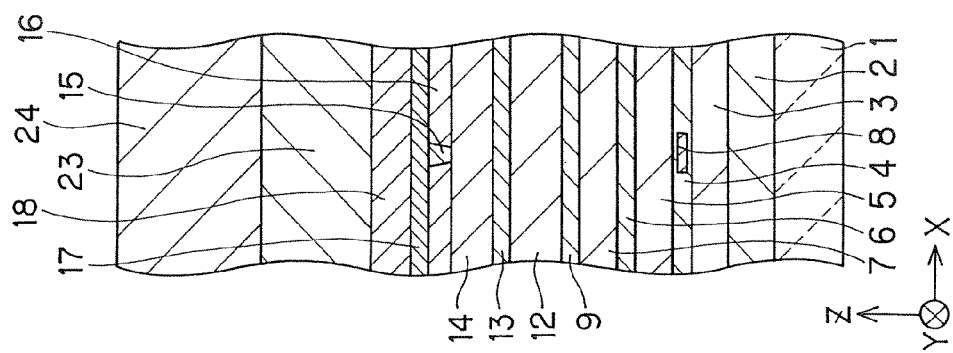

THIN-FILM MAGNETIC HEAD, HEAD GIMBAL ASSEMBLY, AND HARD DISK SYSTEM

BACKGROUND OF THE INVENTION

1. Field of the Invention

The present invention relates to a thin-film magnetic head comprising a perpendicular recording head portion adapted to implement magnetic recording operation in the perpendicular recording mode as well as a head gimbal assembly and a hard disk system comprising that thin-film magnetic head.

2. Explanation of the Prior Art

By the recording mode, a thin-film magnetic head is broken down into a longitudinal recording mode in which information is recorded in a hard disk (recording medium) in its longitudinal direction and a perpendicular recording mode in which data are recorded with the direction of recording magnetization set in the perpendicular direction to the recording plane of the hard disk. Of these, a thin-film magnetic head of the perpendicular recording mode is now considered to be more promising than that of the longitudinal recording mode, because of having the merits of having much higher recording densities and being less likely to be affected by thermal fluctuations.

When the thin-film magnetic head of the perpendicular recording mode is operated to record data in an inner or outer peripheral area of a hard disk that is a recording medium, by the way, the magnetic pole end of a main magnetic pole on an air bearing surface (ABS) side—said main magnetic pole is located on that ABS that is a plane opposed to the recording medium—makes a certain skew angle with the tracks of the hard disk. When the perpendicular magnetic recording head has high write capability, there is a problem or a so-called "blurring on write" in which redundant data get recorded between adjoining tracks by the occurrence of that skew angle. This "blurring on write" has adverse influences on the detection of servo signals, and the S/N ratio of output waveforms. For this reason, a conventional perpendicular magnetic recording head has a main magnetic pole layer with its ABS side-magnetic pole end configured into a trapezoidal shape of width decreasing gradually toward one direction.

A problem with the prior art perpendicular magnetic recording head is, however, that when information is recorded in it at high densities, there is a phenomenon called "pole erasure" in which data already written in the hard disk are erased off. The "pole erasure" refers to the phenomenon in which after data are written in a hard disk having a large maximum coercive force Hc, a leakage magnetic flux flows from the ABS of the magnetic head into the hard disk even without conduction of recording currents through a thin-film coil, with the result that other data are erased off.

The situation being like this, the present invention has been made with a view to providing a thin-film magnetic head of the perpendicular recording mode, which works for reducing the occurrence of pole erasure, and is improved in the stability of recording operation.

SUMMARY OF THE INVENTION

To address such problems as described above, the present invention provides a thin-film magnetic head comprising a perpendicular recording head portion including a thin-film coil adapted to generate a magnetic flux and a main magnetic pole layer having a main magnetic pole adapted to release a magnetic flux generated at said thin-film coil toward a recording medium, characterized in that:

said main magnetic pole includes a front end portion of a narrow width, extending rearward from a recording medium opposite plane and a rear end portion that is coupled to said front end portion and has a width becoming gradually wide toward the rear, a coupling site of said front end portion to said rear end portion defines a boundary surface defined as a flare point, a section of said front end portion with respect to said recording medium opposite plane has an inverted trapezoidal shape wherein, in consideration of relative movement to said recording medium, a short side is defined by a width W3 of a lower end edge positioned on a leading side, a long side is defined by a width W1 of an upper end edge positioned on a trailing side (W3<W1), and a height H is defined by a thickness thereof, and wherein said inverted trapezoidal shape of that section extends substantially to near said boundary surface defined by the flare point coupled to said rear end portion in the rear, and there are concave grooves found on both inverted trapezoidal sides of the front end portion along substantially a thickness direction when viewing said both sides in a range of up to 100 nm in front of the boundary surface that is a position of said flare point, wherein a depth of each concave groove (width direction) grows larger as the lower end edge of width W3 positioned on the leading side draws nearer.

In an embodiment of the thin-film magnetic head of the invention, it is preferable that D3>D2, where D3 is indicative of a maximum depth (width direction) of a concavity caused by said concave groove in a range of up to 100 nm in front of the boundary surface that is a position of said flare point, as viewed in a section of said front end portion sliced rearward along said lower end edge of width W3, and D2 is indicative of a maximum depth (width direction) of a concavity caused by said concave groove in a range of up to 100 nm in front of the boundary surface that is a position of said flare point, as viewed in a section of said front end portion sliced rearward from a position of a height (½)H of said inverted trapezoidal shape.

In a preferable embodiment of the thin-film magnetic head of the invention, it is preferable that D3>D2>D1, where D3 is indicative of a maximum depth (width direction) of a concavity caused by said concave groove in a range of up to 100 nm in front of the boundary surface that is a position of said flare point, as viewed in a section of said front end portion sliced rearward along said lower end edge of width W3, D2 is indicative of a maximum depth (width direction) of a concavity caused by said concave groove in a range of up to 100 nm in front of the boundary surface that is a position of said flare point, as viewed in a section of said front end portion sliced rearward from a position of a height (½)H of said inverted trapezoidal shape, and D1 is indicative of a maximum depth (width direction) of a concavity caused by said concave groove in a range of up to 100 nm in front of the boundary surface that is a position of said flare point, as viewed in a section of said front end portion sliced rearward along said upper end edge of width W1.

In an embodiment of the thin-film magnetic head of the invention, it is preferable that said D3 is D3=0.

In an embodiment of the thin-film magnetic head of the invention, it is preferable that the value of D3/W3 is in the range of 5/150 to 20/150, where D3 is indicative of a maximum depth (width direction) of a concavity caused by said concave groove in a range of up to 100 nm in front of the boundary surface that is a position of said flare point, as viewed in a section of said front end portion sliced rearward along said lower end edge of width W3.

In an embodiment of the thin-film magnetic head of the invention, it is preferable that the value of D3 is 5 to 20 nm, where D3 is indicative of a maximum depth (width direction) of a concavity caused by said concave groove in a range of up to 100 nm in front of the boundary surface that is a position of said flare point, as viewed in a section of said front end portion sliced rearward along said lower end edge of width W3.

In an embodiment of the thin-film magnetic head of the invention, it is preferable that D3av>D2av, where D3av is indicative of an average depth (width direction) of a concavity caused by said concave groove in a range of up to 100 nm in front of the boundary surface that is a position of said flare point, as viewed in a section of said front end portion sliced rearward along said lower end edge of width W3, and D2av is indicative of an average depth (width direction) of a concavity caused by said concave groove in a range of up to 100 nm in front of the boundary surface that is a position of said flare point, as viewed in a section of said front end portion sliced rearward from a position of a height (½)H of said inverted trapezoidal shape.

In an embodiment of the thin-film magnetic head of the invention, it is preferable that D3av>D2av>D1av, where D3av is indicative of an average depth (width direction) of a concavity caused by said concave groove in a range of up to 100 nm in front of the boundary surface that is a position of said flare point, as viewed in a section of said front end portion sliced rearward along said lower end edge of width W3, D2av is indicative of an average depth (width direction) of a concavity caused by said concave groove in a range of up to 100 nm in front of the boundary surface that is a position of said flare point, as viewed in a section of said front end portion sliced rearward from a position of a height (½)H of said inverted trapezoidal shape, and D1av is indicative of an average depth (width direction) of a concavity caused by said concave groove in a range of up to 100 nm in front of the boundary surface that is a position of said flare point, as viewed in a section of said front end portion sliced rearward along said upper end edge of width W1.

In an embodiment of the thin-film magnetic head of the invention, it is preferable that in addition to a perpendicular recording head portion, there is further a reproducing head portion provided, which is adapted to implement reproduction of magnetic records harnessing a magneto-resistive effect.

The present invention also provides a head gimbal assembly comprising a slider including the aforesaid thin-film magnetic head and located in opposition to a recording medium, and a suspension adapted to resiliently said slider.

Further, the present invention a hard disk system comprising a slider including the aforesaid thin-film magnetic head and located in opposition to a recording medium, and a positioning device adapted to support and position said slider with respect to said recording medium.

With the invention wherein there is a given concave groove form provided near the flare point of the front end portion of the main magnetic pole, which concave groove form become more constricted as the lower end draws nearer, a magnetic flux flow through the main magnetic pole is focused on the upper end edge (gap portion) of the magnetic pole so that overwrite capability is improved to hold back the occurrence of pole erasure.

BRIEF EXPLANATION OF THE DRAWINGS

FIG. 1A is a sectional view of a thin-film magnetic head parallel with the so-called air bearing surface (ABS), and FIG. 1B is a sectional view of the thin-film magnetic head orthogonal to the air bearing surface.

DETAILED EXPLANATION OF THE INVENTION

Figure 2:
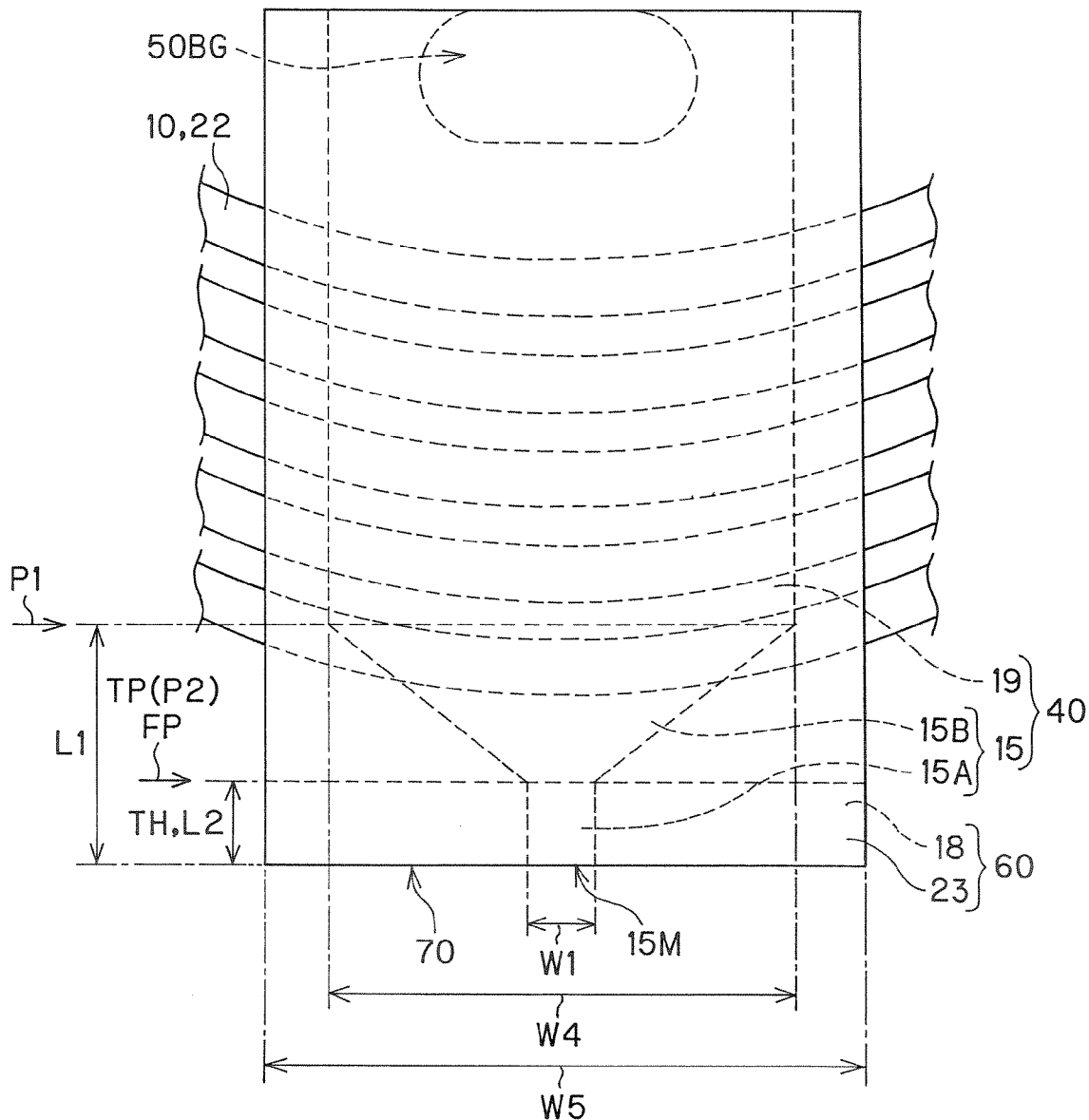
FIG. 2 is an enlarged, perspective view of part of the thin-film magnetic head shown in FIGS. 1A and 1B.

The best mode for carrying out the invention is now explained in details.

Before an account is given of part of the thin-film magnetic head of the invention, its whole structure is first explained with reference to FIGS. 1A, 1B and 2.

FIG. 1A is a sectional view of a thin-film magnetic head parallel with the so-called air bearing surface (ABS), and FIG. 1B is a sectional view of the thin-film magnetic head orthogonal to the air bearing surface. The air bearing surface (ABS) here is tantamount to a plane at which the thin-film magnetic head is opposed to a magnetic recording medium (hereinafter often called the medium opposite plane). FIG. 2 is an enlarged, perspective view of the vicinity of a magnetic pole layer adapted to implement perpendicular magnetic recording.

Certain terminology may be used in the following description for convenience in reference only. For instance, the word "width" would refer to a dimension in the X-axis direction shown in the drawings inclusive of FIGS. 1A, 1B and 2, the "length" to a dimension in the Y-axis direction, and the "thickness" to a dimension in the Z-axis direction. Similarly, the word "front" would refer to a side nearer to the air bearing surface (the surface of the thin-film magnetic head opposed to the recording medium) in the Y-axis direction, and the "rear" to the opposite side (depth side).

The thin-film magnetic head shown in FIGS. 1A and 1B is used on a magnetic recording system such as a hard disk drive for the purpose of applying magnetic processing to a recording medium moving in the direction M of travel of the medium, for instance, a hard disk.

For instance, the thin-film magnetic head illustrated in the drawings is a composite type head capable of implementing both recording and reproducing as magnetic processing. The structure comprises, as shown in FIG. 1, a substrate 1 made of a ceramic material such as AlTiC ($Al_2O_3.TiC$), and an insulating layer 2 made of a nonmagnetic insulating material such as aluminum oxide ($Al_2O_3$; hereinafter referred simply as alumina), a reproducing head portion 100A adapted to reproduce magnetic information recorded by harnessing the magneto-resistive (MR) effect, a separation layer 9 made of a nonmagnetic insulating material such as alumina, a shield type recording head portion 100B adapted to implement a perpendicular recording mode of recording processing, and an overcoat layer 24 made of a nonmagnetic insulating material such as alumina, all stacked one upon another on the substrate 1 in that order.

For instance, the reproducing head portion 100A has a multilayer structure comprising a lower read shield layer 3, a shield gap film 4 and an upper read shield layer 30 stacked one upon another in that order. In the shield gap layer 4, there is a magneto-resistive effect device (MR device) 8 embedded as a reproducing device in such a way that its one end face is exposed on the recording medium opposite plane (air bearing surface) 70.

Both the lower 3 and the upper read shield layer 30 are provided to separate the MR device magnetically from the surroundings, extending rearward from the air bearing surface 70. The lower read shield layer 3 is made of a soft magnetic material such as permalloy (Ni(80 wt %)Fe(20 wt %)) that is a nickel-iron alloy, and has a thickness of about 1.0 to 2.0 µm.

In the embodiment here, the upper read shield layer 30 is divided in two shield layers 5 and 7 via a non-magnetic layer 6 in a thickness direction. In other words, that upper read shield layer 30 has a structure where the upper first read shield layer 5, the nonmagnetic layer 6 and the upper second read shield layer 7 are stacked one upon another in order from its side near to the shield gap layer 4.

The upper first read shield layer 5 is made of a magnetic material such as permalloy, and has a thickness of typically about 1.5 µm. The upper second read shield layer 7 is made of a magnetic material such as permalloy, too, and has a thickness of typically about 1.1 µm. The nonmagnetic layer 6 is made of a nonmagnetic material such as ruthenium (Ru) or alumina, and has a thickness of typically about 0.2 µm.

While it is shown and described that the upper read shield layer 30 has a multilayer structure, it is contemplated that it is not always required to have a multilayer structure; it could have a single-layer structure as is the case with the lower read shield layer 3.

The shield gap film 4 is provided to separate the MR device 8 electrically from the surroundings; for instance, it is made of a nonmagnetic material such as alumina.

The MR device operates in such a way as to implement reproducing processing by making use of typically the giant magneto-resistive (GMR) effect. Instead of the GMR device, a CPP-GMR device or a TMR (tunneling magneto-resistive effect) device could also be used.

The recording head portion 100B, for instance, has a multilayer structure comprising a first-stage thin-film coil 10 buried around with insulating layers 11, 12, 13, a nonmagnetic layer 14, a main magnetic pole layer 40 partially buried around with an insulating layer 16, a gap layer 17, a second-stage thin-film coil 22 buried with an insulating layer 50 that forms a magnetic coupling opening (back gap 50 BG) and a write shield layer 60, all stacked one upon another in order.

In FIG. 2, only a main part (thin-film coils 10, 22, main magnetic pole layer 40 and write shield layer 60) extracted out of the recording head portion 100B is primarily shown.

The thin-film coil 10 has a primary function of generating a leakage-preventive magnetic flux for holding back leakage of a recording magnetic flux produced at the thin-film coil 22. This thin-film coil 10 is made of a highly electroconductive material such as copper, and has a thickness of typically about 2.0 µm.

As shown typically in FIGS. 1 and 2, the thin-film coil 10 in particular has a spiral structure having turns about the back gap 50BG. The thin-film coil 10 typically operates such that currents flow in a direction opposite to the direction taken by currents flowing through the thin-film 22. While it is shown in FIGS. 1 and 2 that the thin-film coil 10 has five turns by way of illustration alone, it is contemplated that the number of turns could optionally be varied. Preferably, the thin-film coil 10 should have as many turns as the thin-film coil 22, for instance, 2 to 7 turns. The thin-film coil 10 may just as well be used in a helical coil form.

The insulating layers 11, 12, 13 are formed in such a way as to separate the thin-film coil 10 electrically from the surroundings. The insulating layer 11 is formed in such a way as to be filled up between the turns of the thin-film coil 10 and provide a cover around the thin-film coil 10. This insulating layer 11 is made of a non-magnetic insulating material such as a photoresist (photosensitive resin) exhibiting fluidity upon heating, and has a thickness of typically about 2.0 µm.

In the embodiment here, the insulating layer 11 is formed in such a way as to cover only the sides of the thin-film coil 10 but provide no cover to the upper side of the thin-film coil 10, as shown in FIG. 1.

The insulating layer 12 is formed in such a way as to provide a cover around the insulating layer 11. This insulating layer 12 is made of a nonmagnetic material such as alumina, and has a thickness of typically about 2.0 µm.

The insulating layer 13 is formed in such a way as to give a cover to the thin-film coil 10 as well as the insulating layers 11, 12. This insulating layer 13 is made of a nonmagnetic material such as alumina, and has a thickness of typically about 0.2 µm.

The nonmagnetic layer 14 is formed of a nonmagnetic insulating material such as alumina, or a nonmagnetic electroconductive material such as ruthenium, and has a thickness of typically about 1.0 µm.

The main magnetic pole layer 40 has a primary function of implementing recording processing by receiving a magnetic recording magnetic flux produced at the thin-film coil 22 and releasing that magnetic flux toward the recording medium. More specifically, it produces a magnetic field (perpendicular magnetic field) for magnetizing the recording medium in a direction orthogonal to its surface on the basis of a recording magnetic flux for the perpendicular recording mode of recording processing.

Such main magnetic pole layer 40 is located on the leading side of the thin-film coil, extending rearward from the air bearing surface 70, more specifically, as far as the back gap 50 BG. It is noted that when the state of movement of the recording medium that moves toward the direction M of travel of the medium shown in FIG. 1 is viewed as a sort of flow, the aforesaid "leading side" would refer to the incoming side (opposite to the medium travel direction M side) of that flow that is here corresponding to the upstream side in the thickness (Z-axis) direction. On the other hand, the outgoing side of the flow (the medium travel direction M side) would be called the "trailing side" that is here corresponding to the downstream side in the thickness direction.

In the embodiment here, the main magnetic pole layer 40 has a structure where, as shown in FIG. 1, a main magnetic pole layer 15 and a magnetic pole dominant layer 19 are stacked one upon another in order and thereby coupled to each other. In other words, it has a multilayer (double-layer) structure where the main magnetic pole 15 is located on the leading side and the magnetic pole dominant layer 19 is located on the trailing side.

The main magnetic pole 15 functions as a portion for releasing off a main writing magnetic flux. This main magnetic pole 15 extends rearward from the air bearing surface 70 on the leading side, more specifically, as far as the back gap 50 BG, and has a thickness of typically about 0.25 μm. Such main magnetic pole 15, for instance, is made of a magnetic material that is higher in saturation flux density than the magnetic material of which the magnetic pole dominant layer 19 is made, specifically, an iron alloy or the like. The iron alloy here, for instance, includes an iron-nickel alloy (FeNi), an iron-cobalt alloy (FeCo) or an iron-cobalt-nickel alloy (FeCoNi), all rich in iron (Fe).

It is noted that the aforesaid "coupled" would mean just only a coupling involving physical contact but also a coupling involving physical contact plus a magnetically conductive coupling.

As shown in FIG. 2, the main magnetic pole 15 is configured in a generally battledore type planar shape. To be more specific, the main magnetic pole 15 comprises, in order from the air bearing surface 70, a front end 15A that extends rearward from that air bearing surface 70 and having a constant width W1 for defining the recording track width of the recording medium and a rear end 15B that is linked to the rear of that front end 15A and having a width W4 greater than the width W1 (W4>W1). The position at which the width of the main magnetic pole 15 starts growing wide from the front end 15A (of width W1) toward the rear end 15B (of width W4) is a "flare point FP" that is one of important determinants for the recording performance of the thin-film head. Note here that the main magnetic pole 15 may just as well be magnetically coupled to the magnetic pole dominant layer 19 by contact with it only along its bottom (on the substrate side).

The front end 15A is primarily adapted to substantially release a recording magnetic flux produced at the thin-film coil 22 toward the recording medium, and has an exposed surface 15M exposed on the air bearing surface 70, as shown in FIG. 2. As shown typically in FIG. 3, the exposed surface 15M takes a planar shape defined by an upper end edge (one end edge) E1 positioned on the trailing side, a lower end edge (another end edge) E2 positioned on the leading side, and two side end edges S1, S2. To be more specific, the exposed surface 15M typically assumes on a trapezoidal shape with its width becoming gradually narrow from the trailing side toward the leading side (W1>W3). The trailing edge E1 of the front end 15A provides a substantial recording site of the main magnetic pole layer 40.

The rear end 15B shown in FIG. 2 is adapted to receive the magnetic flux received in the magnetic pole dominant layer 15 and feed it to the front end 15A. Typically, the width of this rear end 15B remains constant (width W4) in the rear, and becomes gradually narrow from width W4 to width W1 in the front as the front end 15A comes near.

The magnetic pole dominant layer 19 functions as a portion adapted to receive a dominant magnetic flux. Typically, this magnetic pole dominant layer 19 extends rearward from a position P1 (the first position) receded from the air bearing surface 70. To be more specific, it extends as far as the rear of the main magnetic pole 15 at the back gap 50BG, and has a thickness of typically about 0.45 μm. In particular, the magnetic pole dominant layer 19 is made of a magnetic material lower in saturation flux density than the magnetic material of which the main magnetic pole 15 is made. A preferable example is an iron-cobalt-nickel alloy.

As shown typically in FIG. 2, the magnetic pole dominant layer 19 has a rectangular planar shape of width W4. In the magnetic pole dominant layer 19 in particular, both an auxiliary insulating layer 20 of the insulating layer 50 to be described later and a TH defining layer 18 of the write shield layer 60 to be described later are flattened. That is, the end face of the magnetic pole dominant layer 19 on the trailing side forms a flat plane HM together with the end face of the auxiliary insulating layer 20 on the trailing side and the end face of the TH defining layer 18 on the trailing side.

The insulating layer 16 is provided to isolate the main magnetic pole 15 electrically from the surroundings. This insulating layer 16 is made of a nonmagnetic insulating material such as alumina, and has a thickness of typically about 0.25 μm.

The gap layer 17 is formed in such a way as to provide a gap for the magnetic separation of the main magnetic layer 40 from the write shield layer 60. As typically shown in FIG. 1, the gap layer 17 extends rearward from the air bearing surface 70 along the main magnetic pole 15 except an area with the magnetic pole dominant layer 19 located on it. In particular, the gap layer 17 is made of a nonmagnetic insulating material such as alumina or a nonmagnetic electroconductive material such as ruthenium, and has a thickness of typically about 0.03 to 0.1 μm.

The insulating layer 50 defines the throat height TH that is one of important determinants for the recording performance of the thin-film magnetic head, and is adapted to cover the thin-film coil 22 in such a way as to isolate it electrically from the surroundings. As shown in FIG. 1, the insulating layer 50 has a structure where an auxiliary insulating layer 20 (the first insulating layer portion) formed in such a way as to substantially define the throat height TH and a main insulating layer 21 (the second insulating layer portion) formed in such a way as to substantially cover the thin-film coil 22 are stacked one upon another in that order. It follows that there is a multilayer (double-layer) structure involved, wherein the auxiliary insulating layer 20 is located on the leading side and the main insulating layer 21 is located on the trailing side.

As shown in FIG. 1, the auxiliary insulating layer 20 extends along the gap layer 17 and from a position P2 receded from the air bearing surface 70, viz., a position P2 (the second position) between the air bearing surface 70 and a position P1 to the position P1 in the rear. And, the auxiliary insulating layer 20 is provided in such a way as to be adjacent to the magnetic pole dominant layer 19 at the position P1, and adjacent to the write shield layer 60 (the TH defining layer 18 to be described later) at the position P2. In the embodiment here in particular, the auxiliary insulating layer 20 defines a flat plane HM together with the magnetic pole dominant layer 19 and TH defining layer 18.

The aforesaid "position P2" is corresponding to the foremost end position of the insulating layer 50 (nearest to the air bearing surface 70). That is, there is a "zero throat height position TP" for defining the throat height TH. That throat height TH is a distance between the air bearing surface 70 and the zero throat height position TP. This auxiliary insulating layer 20 is made of a nonmagnetic insulating material such as alumina. In the embodiment shown in FIGS. 1 and 2, the zero throat height position TP is in coincidence with the flare point FP.

As shown in FIG. 1, the main insulating layer 21 extends rearward from a position P3 (the third position) between the positions P1 and P2 while lying along the flat plane HM of the auxiliary insulating layer 20. More specifically, the main insulating layer 21 extends in such a way as not to fill up the back gap 50BG, and is receded from the auxiliary insulating layer 20. As shown typically in FIG. 1, this main insulating layer 21 comprises a main insulating layer portion 21A that is located as an underlay of the thin-film coil 22 on the flat plane HM of the auxiliary insulating layer 20, and a main insulating layer portion 21B that is located in such a way as to cover the thin-film coil 22 and the main insulating layer portion 21A around it.

The main insulating layer portion 21A is made of a nonmagnetic material such as alumina, and has a thickness of typically about 0.2 μm.

The main insulating layer portion 21B is made of a nonmagnetic insulating material such as photoresist or spin-on-glass (SOG) that exhibits fluidity upon heating. A portion of this main insulating layer portion 21B at and near its end edge is in such a rounded slant shape as to fall away toward that end edge.

The thin-film coil 22 is formed for the generation of a recording magnetic flux. For instance, the thin-film coil 22 operates such that currents flow in the direction opposite to the direction taken by currents through the aforesaid thin-film coil 10.

The write shield layer 60 works capturing the spreading component of a recording magnetic flux released off the main magnetic pole layer 40, thereby holding back the spreading of that magnetic flux. Located on the trailing side of the main magnetic pole layer 40 and thin-film coil 22, the write shield layer 60 extends rearward from the air bearing surface 70, whereby it is spaced by the gap film 17 away from the magnetic pole layer 20 on its side near to the air bearing surface 70, and linked to the magnetic layer 40 through the back gap 50BG in its side far away from the air bearing surface 70.

The write shield layer 60 here comprises the TH defining layer 18 (the first magnetic shield layer portion) and a yoke layer 23 (the second magnetic shield layer portion) that are separate from each other, and has a structure wherein the TH defining layer 18 and yoke layer 23 are coupled to each other. It is here noted that the write shield layer 60 is not limited to the couple structure as shown; it may be an integral structure.

The TH defining layer 18 functions as a dominant magnetic flux inlet port adapted to capture an extra portion of the magnetic flux released directly from the magnetic pole. As shown typically in FIG. 1, this TH defining layer 18 extends from the air bearing surface 70 as far as a position in the rear, more specifically, as far as the position P2 in front of the position P1 while lying adjacent to the gap layer 17, so that at that position P2 it lies adjacent to the auxiliary insulating layer 20 of the insulating layer 50.

The TH defining layer 18 is made of a magnetic material having a high saturation flux density such as permalloy or an iron-base alloy, and assumes on a rectangular planar shape having a width W5 greater than the width W4 of the main magnetic pole layer 40 (W5>W4), as shown in FIG. 2. In particular, the TH defining layer 18 forms the flat plane HM together with the magnetic pole dominant layer 19 and auxiliary insulating layer 20, as typically described above. In other words, the end face of the TH defining layer 18 on the trailing side forms the flat plane HM together with both the end face of the magnetic pole dominant layer 19 on the trailing side and the end face of the auxiliary insulating layer 20 on the trailing side. The TH defining layer 18 lies adjacent to the auxiliary insulating layer 20 at the position P2 as described above; that is, the TH defining layer 18 takes a substantial role of defining the foremost end position of the insulating layer 50 (the zero throat height position TP), thereby defining the throat height TH.

The yoke layer 23 is set up in such a way as to function as a passage for the magnetic flux captured out of the TH defining layer 18. Plus, it is constructed in such a way as to function as a return yoke through which the magnetic flux goes back from the lined layer of the medium. As shown typically in FIG. 1, the yoke layer 23 goes over the TH defining layer 18, extending at least as far as the back gap 50BG from the air bearing surface 70 via on the insulating layer 50. In other words, in the front, there is the yoke layer 23 going over the TH defining layer 18 and linked to it, and in the rear, there is the yoke layer 23 lying adjacent to the main magnetic pole layer 40 through the back gap 50BG and linked to it.

In the embodiment here, for instance, the yoke layer 23 extends as far as the rear of the back gap 50BG while linked to the main magnetic pole layer 40 at the back gap 50BG. Such yoke layer 23, for instance, is made of a magnetic material similar to that of which the TH defining layer 18 is made, and takes a rectangular planar shape having a width W5 as shown in FIG. 2.

Preferably for the thin-film magnetic head as described above, a constant dimension defined on the basis of a specific component is optimized to make sure recording performance, as shown typically in FIG. 1. To be more specific, it is desired that the distance of the auxiliary magnetic pole 19 receded from the air bearing surface 70, viz., a distance L1 between the air bearing surface 70 and the position P1 be 0.8 to 7.1 μm. The distance of the main insulating layer 21 receded from the air bearing surface 70, viz., a distance L3 between the air bearing surface 70 and the position P3 is greater than the length of the TH defining layer 18, viz., a distance L2 between the air bearing surface 70 and the position P2 (L3>L2). In consideration of the structural relation where the distance L3 is greater than the distance L2, the write shield layer 60 is designed such that the length of a portion of the yoke layer 23 adjacent to the TH defining layer 18 (viz., the distance L3) is greater than the length of the TH defining layer (viz., the distance L2). In other words, when the magnetic flux is captured in the yoke layer 23 of the write shield layer 60 via the TH defining layer 18, the magnetic path taken by that magnetic flux flowing through the write shield layer 60 is incrementally expanded.

It is here understood that the whole structure of the thin-film magnetic head as described above is disclosed by way of example alone; it could be modified in various ways.

Such a thin-film magnetic head is fabricated by forming the respective components in order and stacking them one upon another using existing thin-film processes including film-formation techniques represented by plating or sputtering, patterning techniques represented by photo-lithography techniques, and etching techniques represented by dry etching or wet etching.

[Explanation of the Form of the Main Magnetic Pole 15—Part of the Invention]

Then, the form or configuration of the main magnetic pole 15 that is part of the invention, especially the form or configuration of the concave grooves formed near the flare point FP of the front end 15A of the main magnetic pole 15, is now explained with reference to FIG. 3, FIG. 4 and FIGS. 5A, 5B and 5C.

Figure 3:
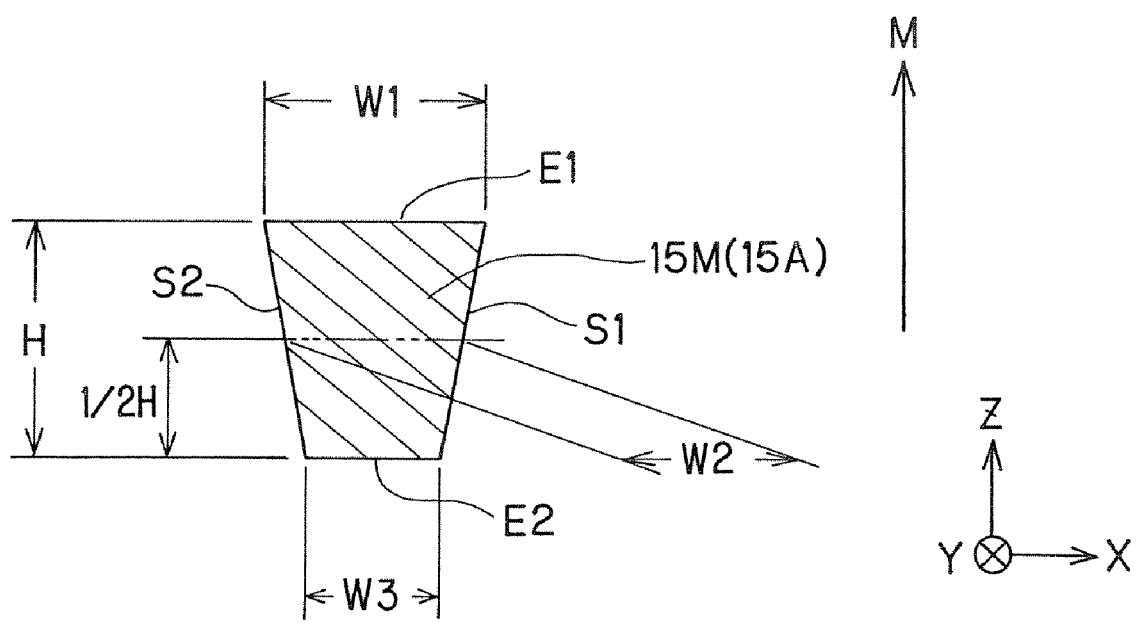
FIG. 3 is a perspective view of the form of the front end of the main magnetic pole 15 on the air bearing surface.
Figure 4:
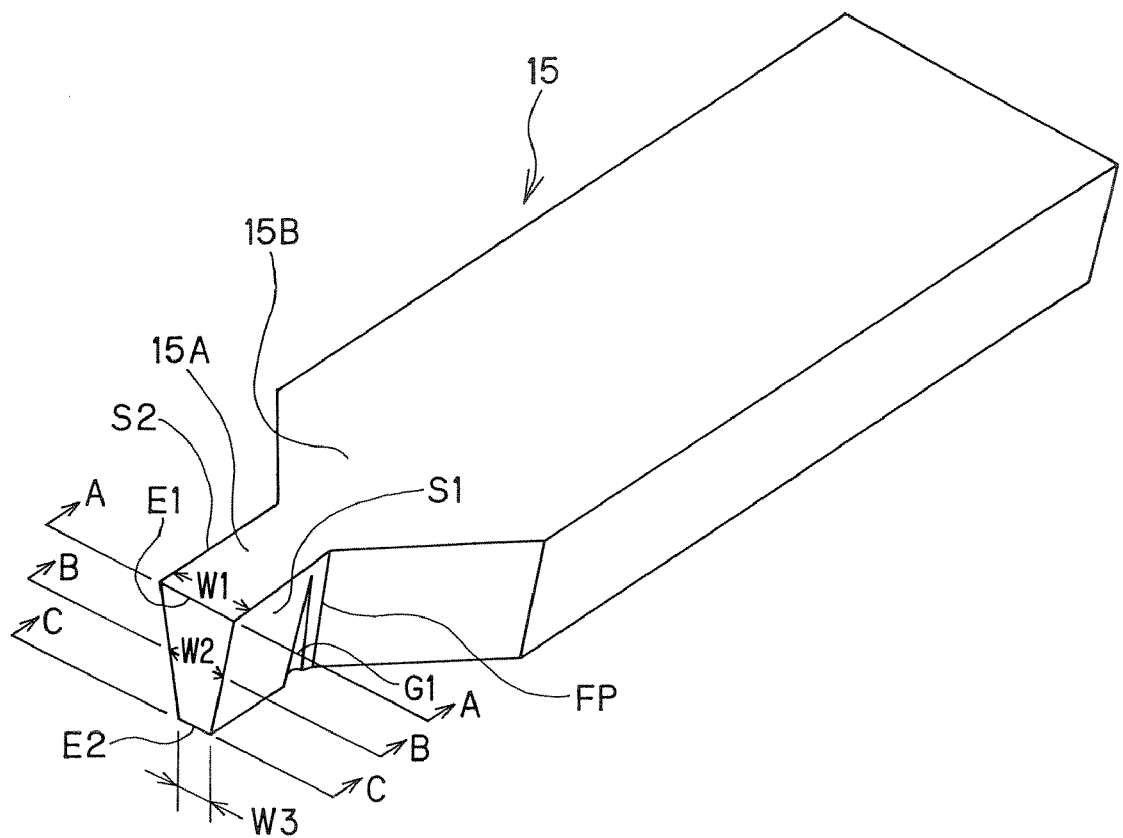
FIG. 4 is a perspective view illustrative of the form of the main magnetic pole 15 that is part of the thin-film magnetic head of the invention.
Figure 5A:
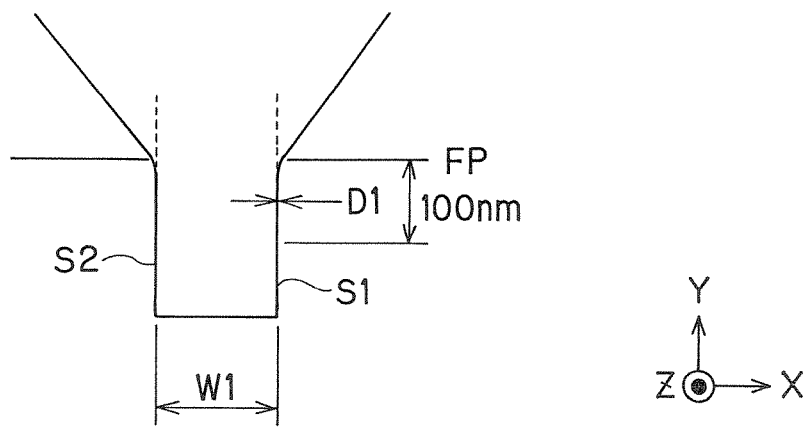
FIG. 5A is illustrative of the planar shape of the front end 15A sliced rearward along the section indicated by an arrow A-A in FIG. 4, viz., the upper end edge E1 of width W1.
Figure 5B:
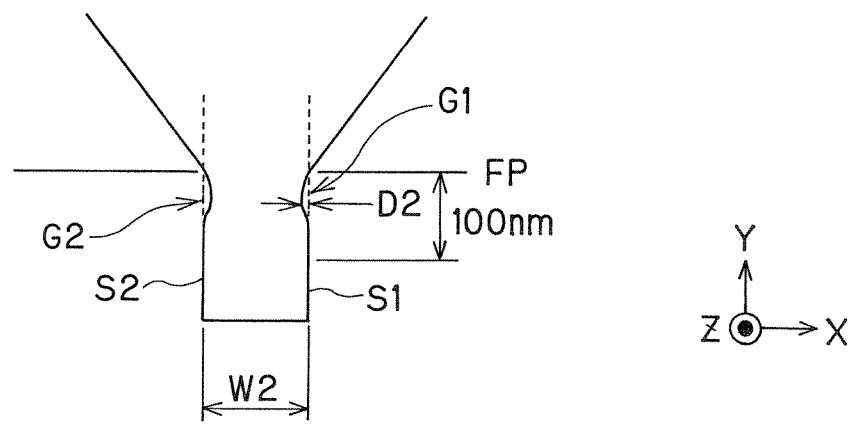
FIG. 5B is illustrative of the planar shape of the front end 15A sliced rearward the section indicated by an arrow B-B, viz., along the position of an intermediate height ((½)H in FIG. 3)
Figure 5C:
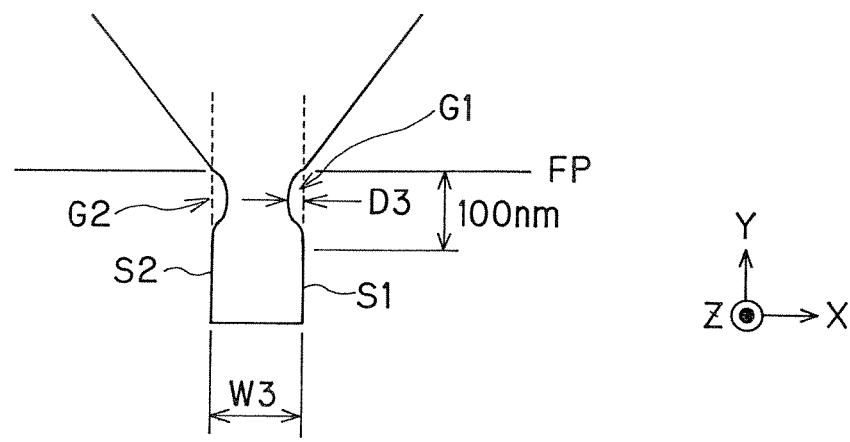
FIG. 5C is illustrative of the planar shape of the front end 15A rearward along the section indicated by an arrow C-C in FIG. 4, viz., the lower end edge E2 of width W3.

FIG. 3 is illustrative of the form of the front end 15A of the main magnetic pole 15 on the air bearing surface 30, and FIG. 4 is a generally schematic view of the main magnetic pole 15. FIG. 5A is illustrative of a section indicated by an arrow A-A in FIG. 4, viz., a planar form of the front end 15A sliced rearward along an upper end edge E1 of width W1; FIG. 5B is illustrative of a section indicated by an arrow B-B in FIG. 4, viz., a planar form of the front end 15A sliced rearward along an halfway height position (a height of (½)H in FIG. 3) of the front end 15A; and FIG. 5C is illustrative of a section indicated by an arrow C-C in FIG. 4, viz., a planar form of the front end 15A sliced rearward along a lower end edge E2 of width W3.

As shown in FIG. 4, the main magnetic pole 15 includes a front end 15A of a narrow width, extending rearward from the recording medium opposite plane, and a rear end 15B coupled to that front end and having a portion with its width increasing rearward. For instance, in the rear the width of the rear end 15B is greater than that of the front end 15A, and in the front, it becomes gradually small toward the front end 15A.

The joining surface of the front 15A and the rear end 15B, viz., the position at which the width of the main magnetic pole 15 starts growing large from the substantially constant width is the so-called flare point FP. This flare point FP provides a position where, upon currents flowing through the main magnetic pole 15 from the rear end 15B toward the front end 15A, a magnetic flux is focused so as to feed a sufficient amount of magnetic flux to the front end 15A: it is an important factor contributing to recording performance.

The front end 15A functions as a substantial portion for releasing a magnetic flux. As depicted in FIG. 3, this front end 15A is of an inverted trapezoidal shape in section on the air bearing surface, wherein, in consideration of its relative movement to the recording medium traveling in the medium travel direction M, its short side is defined by the width W3 of the lower end edge E2 positioned on the leading side, its long side is defined by the width W2 of the upper end edge E1 positioned on the trailing side (W3<W1), and its height H is defined by its thickness. And, such an inverted trapezoidal shape in section as depicted in FIG. 3 extends substantially to the vicinity of a boundary surface defined as the flare point FP coupled to the rear end 15B rearward from the air bearing surface 30 that is the recording medium opposite plane. The reason why that trapezoidal shape "extends substantially" is that when viewing both inverted trapezoidal sides S1, S2 of the front end 15A in a range of up to 100 nm in front of the boundary surface that is the position of the flare point, there are concave grooves G1, G2—part of the invention—found on both such sides S1, S2 along substantially the thickness direction, as described later.

To be more specific, when viewing both inverted trapezoidal sides S1, S2 of the front end 15A of the main magnetic pole 15 in the invention in the range of up to 100 nm in front of the boundary plane that is the position of the flare point FP, there are the concave grooves G1, G2 found on both such sides S1, S2 along substantially the thickness direction (substantially the Z direction), wherein each concave groove G1, G2 is formed such that its depth (width direction: X direction) grows gradually large as the lower end edge E2 of width W3 positioned on the leading side draws nearer. Usually, the degree of depth of each concave groove G1, G2 that grows gradually large as the lower end edge E2 draws nearer often becomes linear; however, it is not necessarily linear. In other words, it may grow large in a curve form.

Note here that in the perspective view of FIG. 4, only the concave groove G1 on the side S1 along substantially the thickness direction is visible under the influence of a perspective viewing direction; the concave groove G2 on the side S2 along substantially the thickness direction is hidden behind the back side that is the opposite side.

How the depth of each concave groove G1, G2 that grows gradually large as the lower end edge E2 draws nearer is explained in further details with reference to the sectional views of FIGS. 5A, 5B and 5C. Usually, the concave grooves G1, G2 formed in both inverted trapezoidal sides S1, S2 of the front end 15A are often in the same shape; the concave groove G1 formed in the side S1 is now explained as a typical example. As long as the requirement for the concave grooves in the invention of this application is satisfied, of course, the concave grooves G1 and G2 need not have the same shape; they may have different shapes.

As depicted in FIG. 5C that is illustrative of a section of the front end 15A sliced rearward along the lower end edge E2 of width W3 (see FIG. 4), let D3 be indicative of the maximum depth (width direction: X direction) of a concavity caused by the concave groove G1 in the range (as described with reference to FIG. 5C) of up to 100 nm in front of the boundary surface that is the position of the flare point FP; as depicted in FIG. 5B that is illustrative of a section of the front end 15A sliced rearward from the position of the height (½)H of the inverted trapezoid, let D2 be indicative of the maximum depth (width direction: X direction) of a concavity caused by the concave groove G1 in the range (as described with reference to FIG. 5B) of up to 100 nm in front of the boundary surface that is the position of the flare point FP; and as depicted in FIG. 5A that is illustrative of a section of the front end 15A sliced rearward along the upper end edge E1 of width W1, let D1 be indicative of the maximum depth (width direction: X direction) of a concavity caused by the concave groove G1 in the range (as described with reference to FIG. 5A) of up to 100 nm in front of the boundary surface that is the position of the flare point FP.

In such configurations as depicted in FIGS. 5A, 5B and 5C, the concave groove G1 according to the invention is formed in such a way as to meet a specific relation between D3, D2 and D1: D3>D2>D1. In a preferable embodiment wherein the advantages of the invention become greatest, D1=0. In other words, it is preferable that the upper end edge E1 of width W1 has no concavity caused by the concave groove G1. When D1>0, there is an inconvenience such as overwrite performance deterioration tending to occur. Therefore, it is desired that the concave groove G1 is formed in such a way as to substantially meet the relation D3>D2>0. When D2=0, on the other hand, there is an inconvenience such as a high probability of incidence of pole erasure tending to occur.

In the state depicted in FIG. 5C, the value of D3/W3 that is the ratio of the maximum depth D3 of the concavity to the width W3 of the lower end edge E2 should be in the range of 5/150 to 20/150, preferably 10/150 to 18/150. As that value deviates from the aforesaid range, or as the lower limit of 1/150 is not reached or the upper limit of 20/150 is exceeded, it causes some inconveniences such as high percentages of rejects due to high frequencies of incidence of pole erasure. Referring here to one specific relation between W3 and D3, when the width W3 of the lower end edge E2 is 150 nm, the value of D3 is about 5 to 20 nm.

In the invention, it is also contemplated that instead of defining the configuration of the concave groove G1 in terms of such maximum depth of the concavity (width direction: X direction) as described above, it may be defined in terms of such an average depth value as described below. That is, in the state depicted in FIG. 5C and in the section of the front end 15A sliced frontward from the boundary surface that is the position of the flare point FP, let D3av be indicative of an average depth (width direction: X direction) of a concavity caused by the concave groove G1 in the range (as described with reference to FIG. 5C) of up to 100 nm in front of the boundary surface that is the position of the flare point FP; in the state depicted in FIG. 5B and in the section of the front end 15A sliced rearward from the position of the height (½)H of the inverted trapezoid, let D2av be indicative of an average depth (width direction: X direction) of a concavity caused by the concave groove G1 in the range (as described with reference to FIG. 5B) of up to 100 nm in front of the boundary surface that is the position of the flare point FP; and in the state depicted in FIG. 5A and in the section of the front end 15A sliced rearward along the upper end edge E1 of width W1, let D1av be indicative of an average depth (width direction: X direction) of a concavity caused by the concave groove G1 in the range (as described with reference to FIG. 5A) of up to 100 nm in front of the boundary surface that is the position of the flare point FP. Then, the concave groove G1 is formed in such a way as to satisfy a specific average depth relation: D3av>D2av>D1av. To allow the advantages of the invention to become greatest, it is preferable that D1av=0. Therefore, the concave groove G1 should preferably be formed in such a way as to substantially meet the relation: D3av>D2av>0.

Referring here to how to figure out the average depth (depth width: X direction) in section of the concavity caused by the concave groove G1 (how to figure out the average of depth), 11 values of the depth of the concavity in increments of 10 nm in the range of 100 nm in front of the boundary surface that is the position of the flare point FP are averaged.

Next, how to form the main magnetic pole 15 having such front end 15A as described above is explained with reference to FIGS. 6A through 6H that are illustrative with time of the steps of forming the main magnetic pole 15, as viewed from the air bearing surface.

Figure 6A:
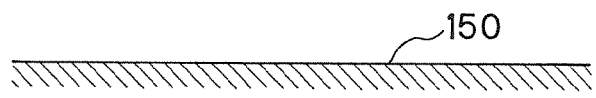
FIGS. 6A to 6H are illustrative with time of how to form the main magnetic pole 15 having the front end 15A, as viewed from the air bearing surface.

Illustrated in FIG. 6A is the surface of a substrate 150 just before the main magnetic pole 15 of the perpendicular recording head portion is provided on it.

Figure 6B:
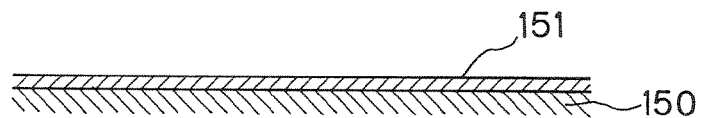

Then, as shown in FIG. 6B, an electrode film 151 acting as a seed is formed by means of sputtering, CVD or like other techniques. This electrode layer 151 should preferably be made of the same composition as that of the main magnetic pole 15. Below the electrode layer 151, there may be an adhesion-enhancement layer such as Cr or Ti added.

Figure 6C:
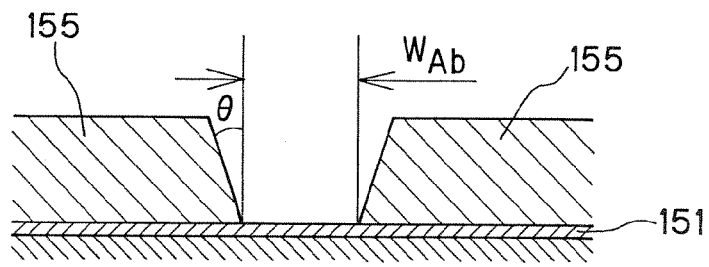

Then, as shown in FIG. 6C, a resist frame 155 is formed on the electrode layer 151. To be more specific, after the coating of a resist film on the electrode layer 151, prebaking is carried out to place a mask on that resist film, after which the resist film is selectively exposed to light and developed with the use of photo-lithography. The resist frame here may be thought of as a female cavity for embedding the main magnetic pole 15 (front end 15A) in it. To put it another way, the concavity formed in the main magnetic pole 15 would be seen as a convexity, when viewed from the resist frame. Therefore, to form such concave grooves G1, G2 as depicted in FIGS. 4 and 5A-5C—part of the invention of this application, viz., the concave grooves G1, G3 in the front end 15A of the main magnetic pole 15 near the flare point FP, convex ribs corresponding to the concave grooves G1, G2 in the front end 15A must be provided at given sites of the resist frame. When the convex ribs corresponding to the concave grooves G1, G2 are formed at the given sites of the resist film, focusing upon exposure in particular becomes one important factor. For instance, when the resist frame is formed in a state of focus=0 (where the focus has been fixed on the surface of the substrate), the value of D3 taken as the main magnetic pole 15 in FIG. 5C is substantially close to zero, because there are no convex ribs formed. On the other hand, when the resist frame is formed while the focus is shifted to a minus side with respect to that state, viz., in a direction of being away from the surface of the substrate upward, there are large convex ribs formed corresponding to the minus amount of the focus, so that the value of D3 taken as the main magnetic pole 15 in FIG. 5C tends to grow large.

In addition to focusing upon exposure, the pattern configuration (diffraction of light at or near the joining site of the front end 15A and rear end 15B) of the main magnetic pole 15 having such front end 15A and rear end 15B as depicted in FIG. 4, the physical properties of the resist and exposure dose for the resist, too, have influences on the form of the concave grooves G1, G2—the purpose of the invention of this application. However, experimentation has made sure a chief parameter that allows the form of the concave grooves G1, G2 in the main magnetic pole 15 to be easily changed is focusing upon exposure. For this, see the experimental examples given later.

Figure 6D:
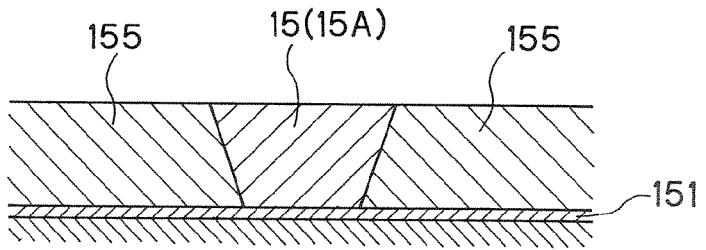

Then, a plated film is formed in an opening in the resist frame as by using plating, as depicted in FIG. 6D, thereby forming the main magnetic pole 15 (front end 15A). As the form of the convex ribs on the aforesaid resist frame is flipped over, it permits the concave grooves G1, G2 (see FIG. 4) to be formed at the front end 15A of the main magnetic pole 15 at or near the flare point FP.

Figure 6E:
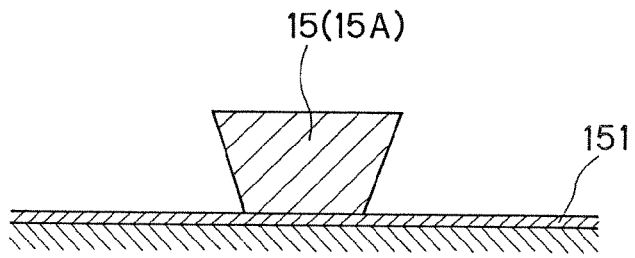

Then, as depicted in FIG. 6E, for instance, the resist frame is dipped in an organic solvent to strip it off by dissolution.

Figure 6F:
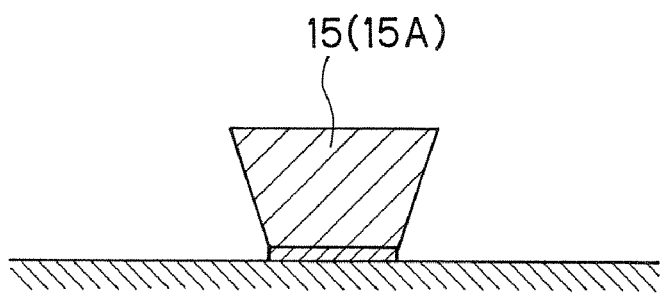

Then, as depicted in FIG. 6F, while the main magnetic pole 15 (front end 15A) that is the plated film is used as a mask to etch the exposed electrode film 151 off by means of milling or the like.

Figure 6G:
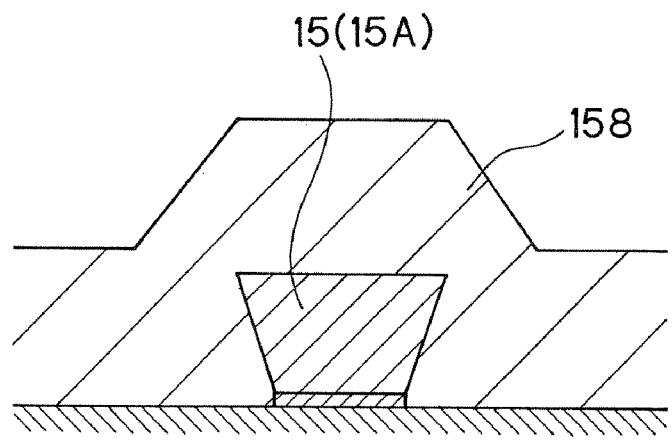

Then, as depicted in FIG. 6G, a flattening film 158 made of alumina or the like is formed in such a way as to cover the main magnetic pole 15 (front end 15A).

Figure 6H:
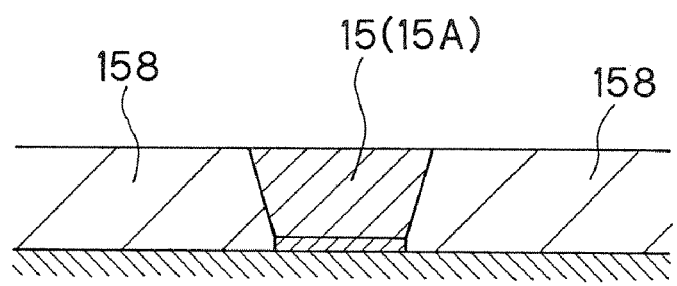

Then, as depicted in FIG. 6H, flattening is carried out by means of CMC until the main magnetic pole 15 (front end 15A) reaches a given thickness.

Through the aforesaid steps of FIGS. 6A-6H, the main magnetic pole 15 of the perpendicular recording head portion is formed.

(Explanation of the Head Gimbal Assembly and the Hard Disk System)

One each example of the head gimbal assembly on which the such a thin-film head as described above is mounted and the hard disk system is now explained.

A slider 210 included in the head gimbal assembly is first explained with reference to FIG. 7. In the hard disk system, the slider 210 is located in such a way as to face a hard disk that is a rotationally driven disk-form recording medium. This slider 210 primarily comprises a substrate 211 built up of a substrate and an overcoat.

The substrate 211 is in a generally hexahedral shape. Of the six surfaces of the substrate 211, one surface is in opposition to the hard disk. On that one surface there is a medium opposite plane 70 formed.

Figure 7:
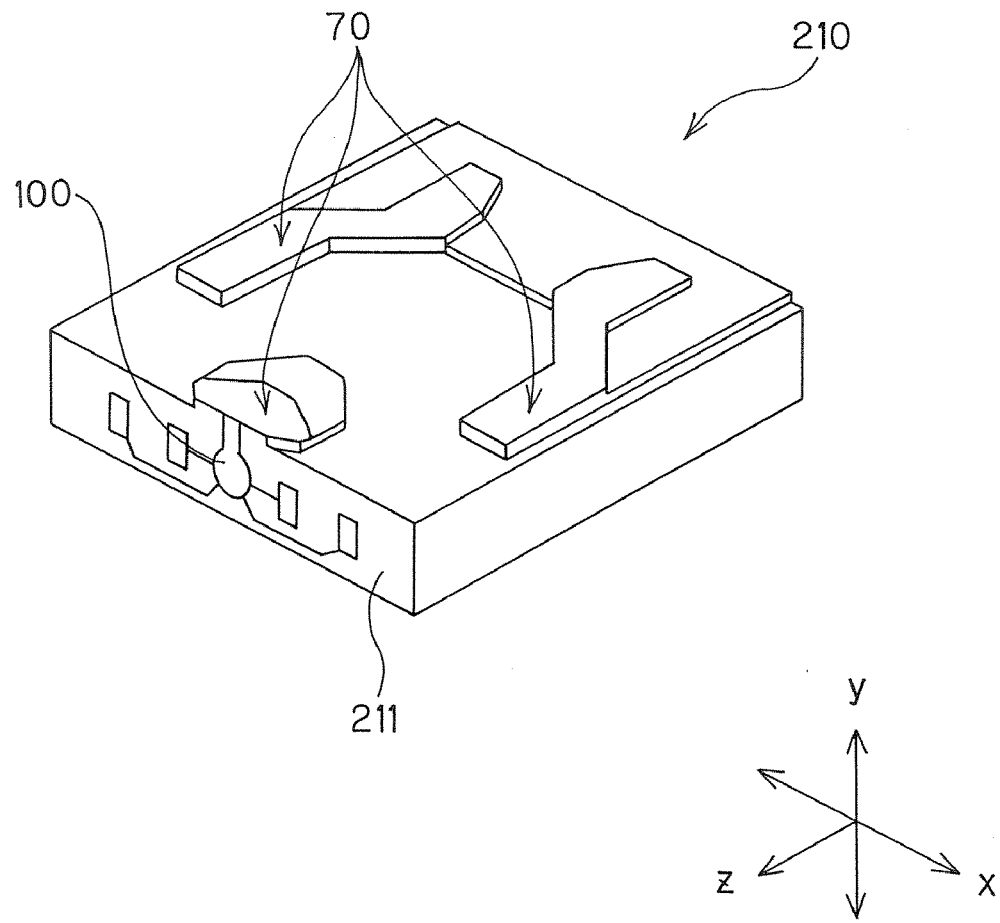
FIG. 7 is a perspective view illustrative of the slider included in the head gimbal assembly according to one embodiment of the invention.

As the hard disk rotates in the z-direction in FIG. 7, it causes an air flow passing between the hard disk and the slider 210 to induce lift relative to the slider 210 in the downward y-direction in FIG. 7. This lift in turn causes the slider 210 to levitate over the surface of the hard disk. Note here that the x-direction in FIG. 7 traverses tracks on the hard disk.

Near the end of the slider 210 on an air exit side (the left lower end in FIG. 7), there is the thin-film magnetic head formed according to the embodiment here.

A head gimbal assembly 220 according to this embodiment is now explained with reference to FIG. 8. The head gimbal assembly 220 comprises a slider 210 and a suspension 221 adapted to resiliently support that slider 210. The suspension 221 comprises a leaf spring-form load beam 222 made of typically of stainless steel, a flexure 223 attached to one end of the load beam 222 and having the slider 210 joined to it for giving a suitable degree of flexibility to the slider 210, and a base plate 224 attached to the other end of the load beam 222.

The base plate 224 is adapted to be attached to an arm 230 of an actuator for moving the slider 210 in the track traverse direction x of the hard disk 262. The actuator comprises the arm 230 and a voice coil motor for driving that arm 230. At a portion of the flexure 223 having the slider 210 attached to it, there is a gimbal portion provided for keeping the posture of the slider 210 constant.

The head gimbal assembly 220 is attached to the arm 230 of the actuator. The head gimbal assembly 220 attached to one arm 230 is called a head arm assembly, whereas the head gimbal assembly 220 attached to a carriage at its plurality of arms is referred to as a head stack assembly.

Figure 8:
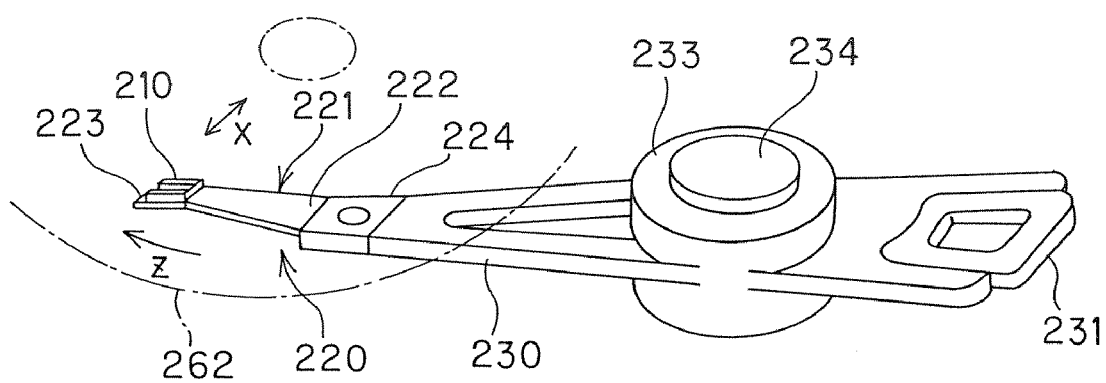
FIG. 8 is a perspective view illustrative of the head arm assembly including the head gimbal assembly according to one embodiment of the invention.

FIG. 8 illustrates one example of the head arm assembly, wherein the head gimbal assembly 220 is attached to one end of the arm 230. To the other end of the arm 230, a coil 231 forming a part of the voice coil motor is attached. Halfway across the arm 230, there is a bearing portion 233 attached to a shaft 234 adapted to support the arm 230 in a pivotal fashion.

One each example of the head stack assembly and the hard disk system according to the embodiment here are now explained with reference to FIGS. 9 and 10.

Figure 9:
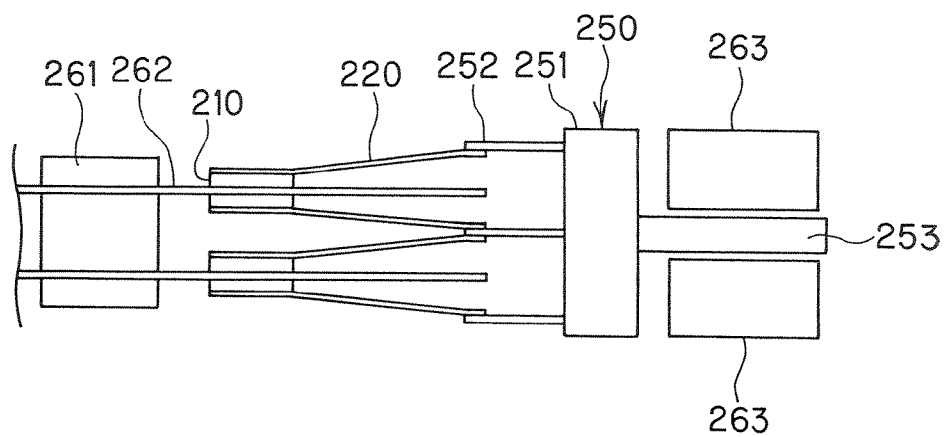
FIG. 9 is illustrative of part of the hard disk system according to one embodiment of the invention.
Figure 10:
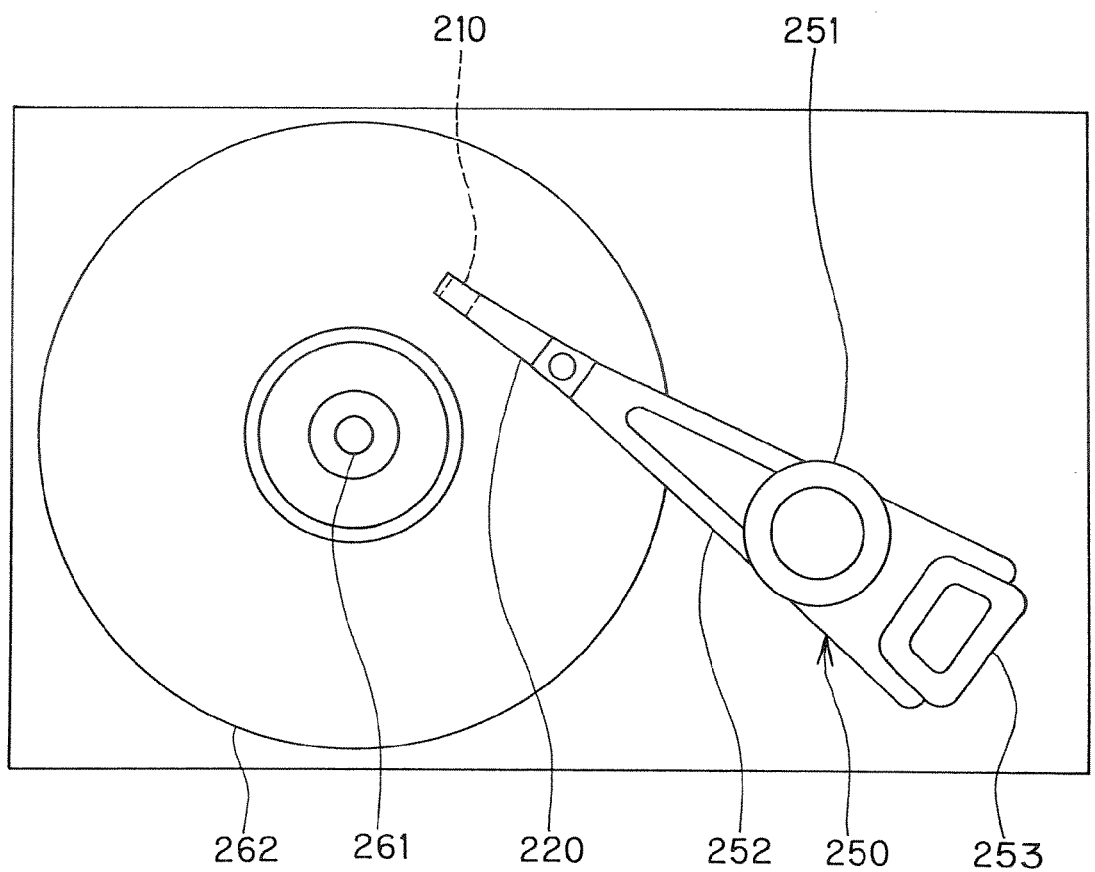
FIG. 10 is a plan view of the hard disk system according to one embodiment of the invention.

FIG. 9 is illustrative of part of the hard disk system, and FIG. 10 is a plan view of the hard disk system.

A head stack assembly 250 comprises a carriage 251 having a plurality of arms 252. The plurality of arms 252 are provided with a plurality of the head gimbal assemblies 220 such that they line up perpendicularly at an interval. On the side of the carriage 251 that faces away from the arms 252, there is a coil 253 attached, which coil becomes a part of the voice coil motor. The head stack assembly 250 is incorporated in the hard disk system.

The hard disk system comprises a plurality of hard disks 262 attached to a spindle motor 261. For each hard disk 262, two sliders 210 are located such that they are opposite to each other with the hard disk 262 held between them. The voice coil motor has also permanent magnets 263 located at opposite positions with the coil 253 of the head stack assembly 250 held between them.

The head stack assembly 250 except the slider 210 and the actuator correspond to the positioning device here which is operable to support the slider 210 and position it relative to the hard disk 262.

With the hard disk system here, the actuator is actuated to move the slider 210 in the track traverse direction of the hard disk 262, thereby positioning the slider 210 with respect to the hard disk 262. The thin-film magnetic head incorporated in the slider 210 works such that information is recorded by a recording head in the hard disk 262, and the information recorded in the hard disk 262 is played back by a reproducing head.

The head gimbal assembly and the magnetic disk system here have pretty much the same action as the thin-film magnetic head according to the foregoing embodiment.

While the embodiment here has been described with reference to the thin-film magnetic head of the structure wherein the reproducing head is located on the substrate side and the recording head is stacked on the reproducing head, it is contemplated that that order of stacking could be reversed. When the thin-film magnetic head here is used as a read-only head, the recording head could be removed from it. It is noted that the thin-film magnetic head referred to here is nothing else than one example of that embodiment; structures and materials of portions other than the main magnetic pole layer 40 could take various forms or configurations.

The thin-film magnetic head of the invention is now explained in further details with reference to some specific examples of experimentation.

EXPERIMENTAL EXAMPLE

Experimentation was carried out for the purpose of making sure the advantages of the invention, using a thin-film magnetic head sample comprising a perpendicular recording head portion having a main magnetic pole—part of the invention as described above.

Preparation of a Sample According to Example 1

The main magnetic pole 15 that was part of the invention and had such configuration as illustrated in FIG. 4 was prepared according to the steps of FIGS. 6A to 6H, specifically the following steps. A series of fabrication steps just prior to the formation of the main magnetic pole 15 are left out. An arrangement prior to the formation of the main magnetic pole 15 will be understood from the head structure shown typically shown FIG. 1B.

First of all, the electrode film 151 (seed layer) made of a $Ni_{50}Fe_{50}$ composition was sputtered at a thickness of 30 nm on the surface for the formation of the main magnetic pole 15 just before the formation of the main magnetic pole 15 of the perpendicular recording head portion depicted in FIG. 6A (FIG. 6B).

Then, a resist (SEPR Series for Edge Tapers made by The Shin-Etsu Chemical Co., Ltd.) was coated on that electrode layer 15, and then pre-baked at 90° C. for 90 seconds to form a resist film of 0.5 μm in thickness. Then, exposure, PBE and development were carried out the under following conditions.

[Exposure]
Aligner: NSR-TFHEX14D made by Nikon Cooperation
The mask used: 0.2-μm wide Binary
Exposure conditions: NA=0.65 Sigma=0.7
Dose=about 80 mJ/cm$^2$
Focus=−1.0 μm (spaced a 1.0 μm away from the surface of the substrate upward)

[PEB (Post Exposure Bake)]
Post exposure baking was done at a temperature of 100° C. for 90 seconds.

[Development]
A developer comprising a 2.38% TMAH (tetramethyl anhydrite) aqueous solution was used for a 60-second development at one paddle.

In the formed resist pattern configuration, the width of the lowermost layer in FIG. 6C was Wab=150 nm (corresponding to W3 in FIGS. 3 and 4), and the angle of inclination was θ=5 deg. Further, near the flare point FP as viewed from the resist pattern, convex ribs extending in the thickness direction to form the concave grooves G1, G2 of the main magnetic pole layer—part of the invention—were formed by the minus amount of the focus (Focus=−1.0 μm). When such convex ribs were thought of as a part of the main magnetic pole 15, its dimension indicated by D3 in FIG. 5C was D3=5 nm.

Then, a plated film made of a $Ni_{50}Fe_{50}$ composition was grown to a thickness of 0.5 mm in such a way as to fill up an opening delimited by the resist frame, thereby forming a plated film that provided a base for the main magnetic pole 15 (see FIG. 6D).

Then, the resist frame was shaken while immersed in IPA (isopropyl alcohol), thereby dissolving and stripping off the resist frame (see FIG. 6E).

Then, while the plated film was used as a mask, the electrode film (seed film) was milled to etch off it (see FIG. 6F).

Then, alumina ($Al_2O_3$) was sputtered into a 1.0-μm thick flattening film in such a way as to cover the main magnetic pole 15 (see FIG. 6G).

Then, until the thickness of the main magnetic pole 15 was down to 0.4 μm, surface flattening was carried out by means of CMP using foamed urethane pads and alumina slurry (having a particle size of 250 nm) (see FIG. 6H). Note here that the D3 dimension of the main magnetic pole 15 in FIG. 5C—part of the invention—was 5 nm as described above (D3=5 nm); the D2 dimension of the main magnetic pole 15 in FIG. 5B was 2.5 nm (D2=2.5 nm); and the D1 dimension of the main magnetic pole 15 in FIG. 5A was 0 nm (D1=0 nm).

Preparation of a Sample According to Example 2

In this example, the focus for the formation of a resist pattern was changed to Focus=−2.0 μm (spaced a 2.0 μm away from the surface of the substrate upward), and the exposure dose was slightly regulated so as to keep the width of the lowermost layer and the angle of inclination in FIG. 6C at Wab=150 nm (corresponding to W3 in FIGS. 3 and 4) and θ=5 deg., respectively. A sample according to Example 2 of the invention was prepared otherwise in the same way as in Example 1.

In the resultant sample of Example 2, the D3 dimension of the main magnetic pole 15 in FIG. 5C—part of the invention—was 15 nm (D3=15 nm); the D2 dimension of the main magnetic pole 15 in FIG. 5B was 7.5 nm (D2=7.5 nm); and the D1 dimension of the main magnetic pole 15 in FIG. 5A was 0 nm (D1=0 nm).

Preparation of a Sample According to Example 3

In this example, the focus for the formation of a resist pattern was changed to Focus=−2.5 μm (spaced a 2.5 μm away from the surface of the substrate upward), and the exposure dose was slightly regulated so as to keep the width of the lowermost layer and the angle of inclination in FIG. 6C at Wab=150 nm and θ=5 deg., respectively. A sample according to Example 3 of the invention was prepared otherwise in the same way as in Example 1.

In the resultant sample of Example 3, the D3 dimension of the main magnetic pole 15 in FIG. 5C—part of the invention—was 20 nm (D3=20 nm); the D2 dimension of the main magnetic pole 15 in FIG. 5B was 10 nm (D2=10 nm); and the D1 dimension of the main magnetic pole 15 in FIG. 5A was 0 nm (D1=0 nm).

Preparation of a Sample According to Comparative Example 1

In this example, the focus for the formation of a resist pattern was changed to Focus=0 μm (the focus was on the surface of the substrate), and the exposure dose was slightly regulated so as to keep the width of the lowermost layer and the angle of inclination in FIG. 6C at Wab=150 nm and θ=5 deg., respectively. A sample according to Comparative Example 1 was prepared otherwise in the same way as in Example 1.

In the resultant sample of Comparative Example 1, there were no concave grooves G1, G2 formed: the D3 dimension of the main magnetic pole 15 in FIG. 5C was 0 nm (D3=0 nm); the D2 dimension of the main magnetic pole 15 in FIG. 5B was 0 nm (D2=0 nm); and the D1 dimension of the main magnetic pole 15 in FIG. 5A was 0 nm (D1=0 nm).

Preparation of a Sample According to Comparative Example 2

In this example, the focus for the formation of a resist pattern was changed to Focus=−3.0 μm (spaced a 3.0 μm away from the surface of the substrate upward), and the exposure dose was slightly regulated so as to keep the width of the lowermost layer and the angle of inclination in FIG. 6C at Wab=150 nm and θ=5 deg., respectively. A sample according to Comparative Example 2 was prepared otherwise in the same way as in Example 1.

In the resultant sample of Comparative Example 2, the D3 dimension of the main magnetic pole 15 in FIG. 5C was 30 nm (D3=30 nm); the D2 dimension of the main magnetic pole 15 in FIG. 5B was 15 nm (D2=15 nm); and the D1 dimension of the main magnetic pole 15 in FIG. 5A was 0 nm (D1=0 nm).

Regarding the samples of Examples 1-3 and Comparative Examples 1-2, the incidence of pole erasure was examined according to the following procedure.

[Incidence of Pole Erasure]

The pole erasure here refers to a phenomenon where information recorded in a magnetic recording medium is unintentionally erased off by a thin-film head in a non-recording (non-conducting) state. In examining the occurrence of pole erasure, information is recorded in a specific sector A on the magnetic recording medium, and a thin-film magnetic head in a non-conducting state (forcibly magnetized main magnetic pole 15) with information already recorded in another sector B was passed across the sector A five hundreds times while it was at an ordinary levitation height. Afterwards, the output signal intensity of the sector A was measured to figure out a percentage of rejections in terms of the deterioration rate of that output signal intensity (output signal intensity after 500 passages/initial output signal intensity at the time of zero passage×100).

The testing conditions involved here were: effective recording track width=220 nm, recording frequency=180 MHz, recording current (zero·peak)=30 mA, effective playback track width=110 nm, playback voltage=120 mV, and magnetic recording medium's coercive force=4,000×$10^3$(4π) A/m (=4,000 Oe).

The results are set out in Table 1, given just below.

TABLE 1

| Sample No. | Concave grooves of the main magnetic pole layer | | | | Percentage of rejections based on the occurrence of pole erasure (%) |
| --- | --- | --- | --- | --- | --- |
| | D1(nm) | D2(nm) | D3(nm) | D3/W3 | |
| Ex. 1 | 0 | 2.5 | 5 | 5/150 | 12 |
| Ex. 2 | 0 | 7.5 | 15 | 15/150 | 3 |
| Ex. 3 | 0 | 10 | 20 | 20/150 | 8 |
| Comp. Ex. 1 | 0 | 0 | 0 | 0 | 40 |
| Comp. Ex. 2 | 0 | 15 | 30 | 30/150 | 50 |

The advantages of the invention would be evident from the results of Table 1.

By appropriately constricting the size (the value of D3) of the bottom of the magnetic pole, the flow of a magnetic flux could be focused on the upper portion of the magnetic pole so that the overwrite performance could be improved, resulting in prevention of occurrence of pole erasure. As the value of D3 becomes too large, on the other hand, it could cause the flow of the magnetic flux to be held back, making the overwrite performance deteriorate and pole erasure likely to occur.

What we claim is:

1. A thin-film magnetic head comprising a perpendicular recording head portion including a thin-film coil adapted to generate a magnetic flux and a main magnetic pole layer having a main magnetic pole adapted to release a magnetic flux generated at said thin-film coil toward a recording medium, characterized in that:

said main magnetic pole includes a front end portion of a narrow width, extending rearward from a recording medium opposite plane and a rear end portion that is coupled to said front end portion and has a width becoming gradually wide toward the rear, a coupling site of said front end portion to said rear end portion defines a boundary surface defined as a flare point, a section of said front end portion with respect to said recording medium opposite plane has an inverted trapezoidal shape wherein, in consideration of relative movement to said recording medium, a short side is defined by a width W3 of a lower end edge positioned on a leading side, a long side is defined by a width W1 of an upper end edge positioned on a trailing side (W3<W1), and a height H is defined by a thickness thereof, and wherein said inverted trapezoidal shape of that section extends substantially to near said boundary surface defined by the flare point coupled to said rear end portion in the rear, and there are concave grooves found on both inverted trapezoidal sides of the front end portion along substantially a thickness direction when viewing said both sides in a range of up to 100 nm in front of the boundary surface that is a position of said flare point, wherein a depth of each concave groove (width direction) grows larger as the lower end edge of width W3 positioned on the leading side draws nearer.

2. The thin-film magnetic head according to claim 1, wherein D3>D2, where D3 is indicative of a maximum depth (width direction) of a concavity caused by said concave groove in a range of up to 100 nm in front of the boundary surface that is a position of said flare point, as viewed in a section of said front end portion sliced rearward along said lower end edge of width W3, and D2 is indicative of a maximum depth (width direction) of a concavity caused by said concave groove in a range of up to 100 nm in front of the boundary surface that is a position of said flare point, as viewed in a section of said front end portion sliced rearward from a position of a height (½)H of said inverted trapezoidal shape.

3. The thin-film magnetic head according to claim 1, wherein D3>D2>D1, where D3 is indicative of a maximum depth (width direction) of a concavity caused by said concave groove in a range of up to 100 nm in front of the boundary surface that is a position of said flare point, as viewed in a section of said front end portion sliced rearward along said lower end edge of width W3, D2 is indicative of a maximum depth (width direction) of a concavity caused by said concave groove in a range of up to 100 nm in front of the boundary surface that is a position of said flare point, as viewed in a section of said front end portion sliced rearward from a position of a height (½)H of said inverted trapezoidal shape, and D1 is indicative of a maximum depth (width direction) of a concavity caused by said concave groove in a range of up to 100 nm in front of the boundary surface that is a position of said flare point, as viewed in a section of said front end portion sliced rearward along said upper end edge of width W1.

4. The thin-film magnetic head according to claim 3, wherein said D3 is D3=0.

5. The thin-film magnetic head according to claim 2, wherein a value of D3/W3 is 5/150 to 20/150, where D3 is indicative of a maximum depth (width direction) of a concavity caused by said concave groove in a range of up to 100 nm in front of the boundary surface that is a position of said flare point, as viewed in a section of said front end sliced rearward along said lower end edge of width W3.

6. The thin-film magnetic head according to claim 3, wherein a value of D3/W3 is 5/150 to 20/150, where D3 is indicative of a maximum depth (width direction) of a concavity caused by said concave groove in a range of up to 100 nm in front of the boundary surface that is a position of said flare point, as viewed in a section of said front end sliced rearward along said lower end edge of width W3.

7. The thin-film magnetic head according to claim 2, wherein a value of D3 is 5 to 20 nm, where D3 is indicative of a maximum depth (width direction) of a concavity caused by said concave groove in a range of up to 100 nm in front of the boundary surface that is a position of said flare point, as viewed in a section of said front end sliced rearward along said lower end edge of width W3.

8. The thin-film magnetic head according to claim 3, wherein a value of D3 is 5 to 20 nm, where D3 is indicative of a maximum depth (width direction) of a concavity caused by said concave groove in a range of up to 100 nm in front of the boundary surface that is a position of said flare point, as viewed in a section of said front end sliced rearward along said lower end edge of width W3.

9. The thin-film magnetic head according to claim 1, wherein D3av>D2av, where D3av is indicative of an average depth (width direction) of a concavity caused by said concave groove in a range of up to 100 nm in front of the boundary surface that is a position of said flare point, as viewed in a section of said front end portion sliced rearward along said lower end edge of width W3, and D2av is indicative of an average depth (width direction) of a concavity caused by said concave groove in a range of up to 100 nm in front of the boundary surface that is a position of said flare point, as viewed in a section of said front end portion sliced rearward from a position of a height (½)H of said inverted trapezoidal shape.

10. The thin-film magnetic head according to claim 1, wherein D3av>D2av>D1av, where D3av is indicative of an average depth (width direction) of a concavity caused by said concave groove in a range of up to 100 nm in front of the boundary surface that is a position of said flare point, as viewed in a section of said front end portion sliced rearward along said lower end edge of width W3, D2av is indicative of an average depth (width direction) of a concavity caused by said concave groove in a range of up to 100 nm in front of the boundary surface that is a position of said flare point, as viewed in a section of said front end portion sliced rearward from a position of a height (½)H of said inverted trapezoidal shape, and D1av is indicative of an average depth (width direction) of a concavity caused by said concave groove in a range of up to 100 nm in front of the boundary surface that is a position of said flare point, as viewed in a section of said front end portion sliced rearward along said upper end edge of width W1.

11. A thin-film magnetic head, characterized in that in addition to a perpendicular recording head portion as recited in claim 1, there is further a reproducing head portion provided, which is adapted to implement reproduction of magnetic records harnessing a magneto-resistive effect.

12. A head gimbal assembly, characterized by comprising a slider including a thin-film magnetic head as recited in claim 1 and located in opposition to a recording medium, and a suspension adapted to resiliently said slider.

13. A hard disk system, characterized by comprising a slider including a thin-film magnetic head as recited in claim 1 and located in opposition to a recording medium, and a positioning device adapted to support and position said slider with respect to said recording medium.

* * * * *